(12) United States Patent
Gwock (10) Patent No.: US 10,931,512 B2
(45) Date of Patent: Feb. 23, 2021

(54) COMPUTER READABLE MEDIA, METHODS, AND COMPUTER APPARATUSES FOR NETWORK SERVICE CONTINUITY MANAGEMENT

(71) Applicant: LINE Corporation, Tokyo (JP)

(72) Inventor: Jung nam Gwock, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 185 days.

(21) Appl. No.: 16/181,799

(22) Filed: Nov. 6, 2018

(65) Prior Publication Data
US 2019/0140888 A1  May 9, 2019

(30) Foreign Application Priority Data
Nov. 8, 2017  (KR) ........................ 10-2017-0147823

(51) Int. Cl.
*H04L 12/26* (2006.01)
*H04L 12/24* (2006.01)
*H04L 29/06* (2006.01)
*H04L 29/08* (2006.01)

(52) U.S. Cl.
CPC ...... *H04L 41/0645* (2013.01); *H04L 43/0817* (2013.01); *H04L 43/10* (2013.01); *H04L 43/103* (2013.01); *H04L 67/14* (2013.01); *H04L 67/145* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,483,437 B1 * | 1/2009 | Mohaban | H04L 63/029 370/400 |
| 2012/0124431 A1 * | 5/2012 | Bauer | H04L 69/28 714/55 |
| 2015/0026508 A1 * | 1/2015 | Jacobs | G06F 11/1658 714/4.11 |

FOREIGN PATENT DOCUMENTS

KR   10-2007-0111686   11/2007

* cited by examiner

*Primary Examiner* — Zewdu A Beyen
(74) *Attorney, Agent, or Firm* — Harness, Dickey & Pierce, P.L.C.

(57) ABSTRACT

Provided is non-transitory computer-readable recording media storing instructions that, when executed by at least one processor, cause the at least one processor to perform a continuity management method that includes sending a heartbeat signal to a service server that provides a service over a network, sending a packet to an echo server in response to failing to receive a response signal to the heartbeat signal from the service server, and determining whether to continue the service based on whether a response to the packet is received from the echo server.

16 Claims, 7 Drawing Sheets

COMPUTER READABLE MEDIA, METHODS, AND COMPUTER APPARATUSES FOR NETWORK SERVICE CONTINUITY MANAGEMENT

CROSS-REFERENCE TO RELATED APPLICATION(S)

This U.S. non-provisional application claims the benefit of priority under 35 U.S.C. § 119 to Korean Patent Application No. 10-2017-0147823 filed on Nov. 8, 2017, in the Korean Intellectual Property Office (KIPO), the entire contents of which are incorporated herein by reference.

BACKGROUND

Field

One or more example embodiments relate to network service continuity management technology, and more particularly, to continuity management methods that enable a client to distinguishably diagnose a fault of a network and a fault of a server providing a service, computer apparatuses for performing the continuity management methods, and/or non-transitory computer-readable recording media storing instructions that, when executed by at least one processor, cause the at least one processor to perform the continuity management methods.

Background

In general, a terminal, for example, a client device periodically communicates with a server that provides a service to inspect a current state of the service. If such periodical communication fails, the continuity of a network service may be compromised. Accordingly, various techniques for maintaining the continuity of the network service are provided. For example, during a mobile game, a mobile terminal wirelessly connected through a mobile communication network may be forced to disconnect from a wireless network due to an unstable wireless environment or a fault of a game server and accordingly, the ongoing mobile game may be suspended. In this case, the game server may detect abnormal logout of the mobile terminal, may generate short message service (SMS) message information including game connection information, and may transmit the generated SMS message information to the corresponding mobile terminal. When the mobile terminal verifies the SMS message information and reconnects to the wireless network, a user of the mobile terminal may continue to play the mobile game by being provided with game information that the user has been playing right before the occurrence of the forced termination.

However, in such a mobile environment, although a server operates normally and no issue is present in a service, a terminal may erroneously diagnose a temporary disconnection of a mobile access network as a server malfunction, rendering continuous service is impossible. For example, when a mobile terminal erroneously determines a temporary disconnection of a mobile access network as a fault of a first server connected for a service, the mobile terminal may attempt to connect to a second server for the service. In this case, the first server operating normally may attempt to continuously provide the service to the mobile terminal while the mobile terminal attempts to connect to the second server. Accordingly, the continuity of the service may be damaged.

SUMMARY

One or more example embodiments provide a continuity management method that enables a client to distinguishably diagnose a fault of a server providing a service or a fault of a network, a computer apparatus for performing the continuity management method, and/or a non-transitory computer-readable recording medium storing instructions that, when executed by at least one processor, cause the at least one processor to perform the continuity management method.

One or more example embodiments also provide a continuity management method that enables a client to send a packet to a separate echo server in response to receiving no heartbeat response from a server providing a service and to selectively diagnose a fault of the server or a fault of a network depending on whether a response is received from the echo server, a computer apparatus for performing the continuity management method, and a non-transitory computer-readable recording medium storing instructions that, when executed by at least one processor, cause the at least one processor to perform the continuity management method.

One or more example embodiments also provide a continuity management method that may discover (e.g., determine) an appropriate pinhole time by applying (e.g., using) an echo server to measure a pinhole time between a server providing a service and a network address translation (NAT), a computer apparatus for performing the continuity management method, and a non-transitory computer-readable recording medium storing instructions that, when executed by at least one processor, cause the at least one processor to perform the continuity management method.

According to an aspect of at least one example embodiment, there is provided a non-transitory computer-readable recording medium storing instructions that, when executed by at least one processor, cause the at least one processor to perform a continuity management method of a client, the method including sending a heartbeat signal to a service server that provides a service over a network; sending a packet to an echo server in response to failing to receive a response signal to the heartbeat signal from the service server; and determining whether to continue the service based on whether a response to the packet is received from the echo server.

According to an aspect of at least one example embodiment, there is provided a non-transitory computer-readable recording medium storing instructions that, when executed by at least one processor, cause the at least one processor to perform the continuity management method.

According to an aspect of at least one example embodiment, there is provided a continuity management method performed by a client driven by a computer apparatus. The method includes sending a heartbeat signal to a service server that provides a service over a network; sending a packet to an echo server in response to failing to receive a response signal to the heartbeat signal from the service server; and determining whether to continue the service based on whether a response to the packet is received from the echo server.

According to an aspect of at least one example embodiment, there is provided a computer apparatus to drive a client, including at least one processor configured to execute non-transitory computer-readable instructions to send a heartbeat signal to a service server that provides a service over a network, send a packet to an echo server in response to failing to receive a response signal to the heartbeat signal from the service server, and determine whether to continue the service based on whether a response to the packet is received from the echo server.

According to some example embodiments, a client may distinguishably diagnose an issue of a server providing a service or an issue of a network.

Also, according to some example embodiments, in response to receiving no response from a server providing a service, a client may send a packet to a separate echo server and may selectively diagnose a fault of a server or a fault of a network depending on whether a response to the packet is received from the echo server.

Also, according to example embodiments, an appropriate pinhole time may be discovered by applying an echo server to measure a pinhole time between a server providing a service and a network address translation (NAT) server.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Some example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in some example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data). The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A continuity management method according to example embodiments may be performed by a computer apparatus that a client is installed in, communicates with, and receives a service from, such as an electronic device. Here, a computer program, for example, the client, according to some example embodiments may be installed and executed on the computer apparatus. The computer apparatus may perform the continuity management method under control of the executed computer program. The computer program may be stored in a non-transitory computer-readable recording medium in the computer apparatus to implement the continuity management method when executed by the computer apparatus.

Figure 1:
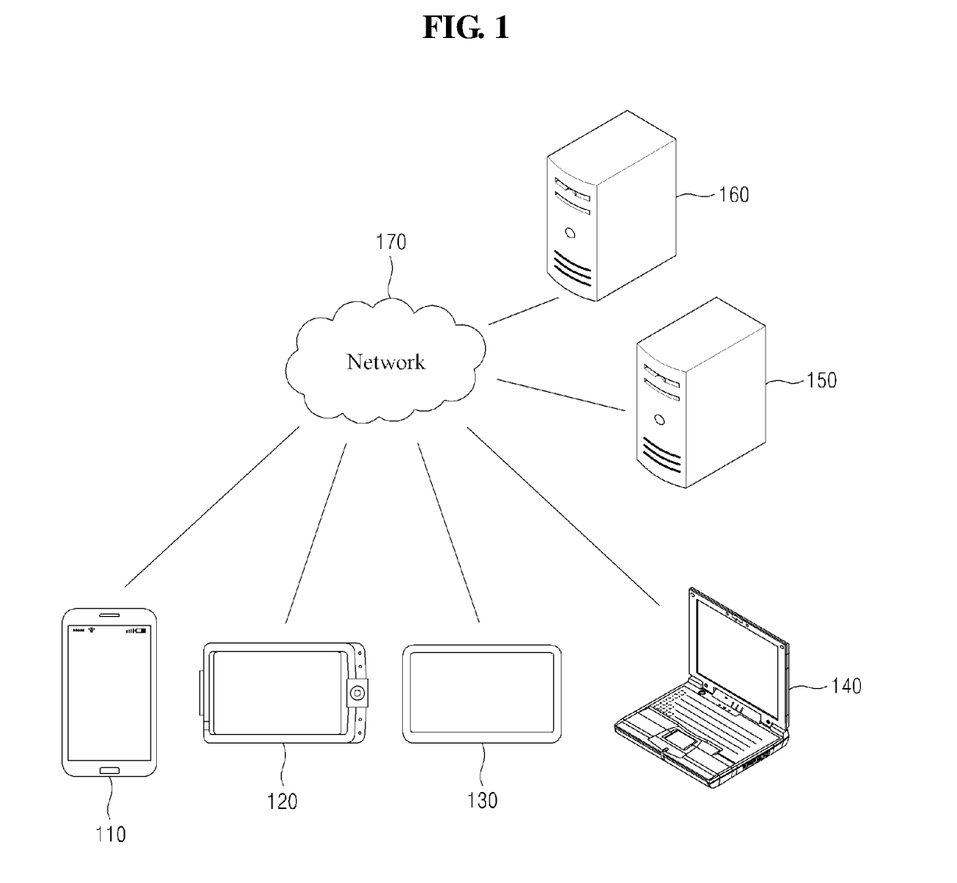
FIG. 1 is a diagram illustrating an example of a network environment according to at least one example embodiment.

FIG. 1 is a diagram illustrating an example of a network environment according to at least one example embodiment. Referring to FIG. 1, the network environment includes a plurality of electronic devices 110, 120, 130, and 140; a plurality of servers 150 and 160; and a network 170. FIG. 1 is provided as an example only and thus, the number of electronic devices, the number of servers, and/or the number of networks is not limited thereto.

Each of the plurality of electronic devices 110, 120, 130, and/or 140 may be a fixed terminal or a mobile terminal configured as a computer device. For example, the plurality of electronic devices 110, 120, 130, and/or 140 may be a smartphone, a mobile phone, a navigation device, a workstation computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, and/or an augmented reality (AR) device, and the like. For example, although FIG. 1 illustrates the electronic device 110 in a shape of a smartphone, it is provided as an example only. Here, the electronic device 110 may refer to any type of various physical computer devices capable of communicating with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like.

However, it is only an example and some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 150 may be a system that provides a first service associated with the plurality of electronic devices 110, 120, 130, and/or 140 connected over the network 170. The server 160 may be a system that provides a second service associated with the plurality of electronic devices 110, 120, 130, and/or 140 connected over the network 170. In detail, the server 150 may be a system that provides the plurality of electronic devices 110, 120, 130, and/or 140 with a variety of services, for example, a game service, a content providing service, and particularly, a mobile service, providable through the network 170. Also, the server 160 may correspond to an echo server, which is described further below.

Figure 2:
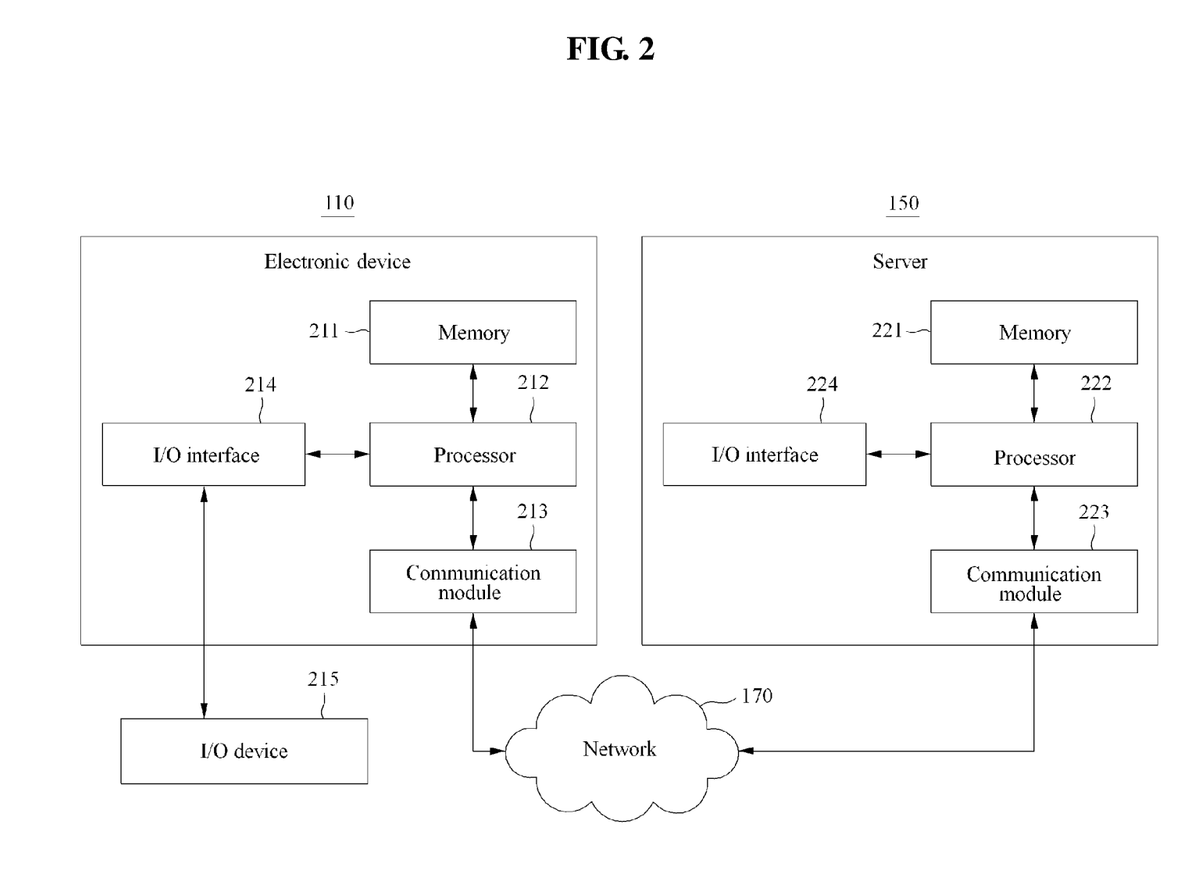
FIG. 2 is a block diagram illustrating a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and/or an input/output (I/O) interface 214, and the server 150 may include a memory 221, at least one processor 222, a communication module 223, and/or an I/O interface 224. However, some example embodiments are not limited thereto, and there may be a greater or lesser number of components included in either the electronic device 110 or the server 150. The memory 211, 221 may include a permanent mass storage device, such as random access memory (RAM), read only memory (ROM), a disk drive, a solid state drive (SSD), a flash memory, etc., as a non-transitory computer-readable storage medium. Here, the permanent mass storage device, such as ROM, disk drive, SSD, flash memory, etc., may be included in the electronic device 110 or the server 150 as a permanent storage device separate from the memory 211, 221. Also, an operating system (OS) or at least one program code, for example, a code for an application for providing a specific service installed on the electronic device 110 or a browser installed and executed on the electronic device 110, may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a Blu-ray/DVD/CD-ROM drive, a memory card, etc. According to some example embodiments, software components may be loaded to the memory 211, 221 through the communication module 213, 223, instead of, or in addition to, the non-transitory computer-readable storage medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O device 215. For example, an input device may include a device, such as a keyboard, a mouse, a microphone, and a camera, a biometric reader, etc., and an output device may include a display device, such as a display, a speaker, and/or a haptic feedback device. As another example, the I/O interface 214 may be a device for interface with an apparatus in which an input function and an output function are integrated into a single function, such as a touchscreen. The I/O device 215 may be configured as a single device in communication with the electronic device 110. Also, the I/O interface 224 of the server 150 may be a device used for connection with the server 150 or for interface with a device (not shown) for input or output includable in the server 150. In detail, when processing instructions of the computer program loaded to the memory 211, the processor 212 of the electronic device 110 may display a service screen configured using data provided from the server 150 or the electronic device 120, or may display content on a display through the I/O interface 214.

According to some example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a haptic feedback motor for vibration, etc., which are generally included in the smartphone.

Figure 3:
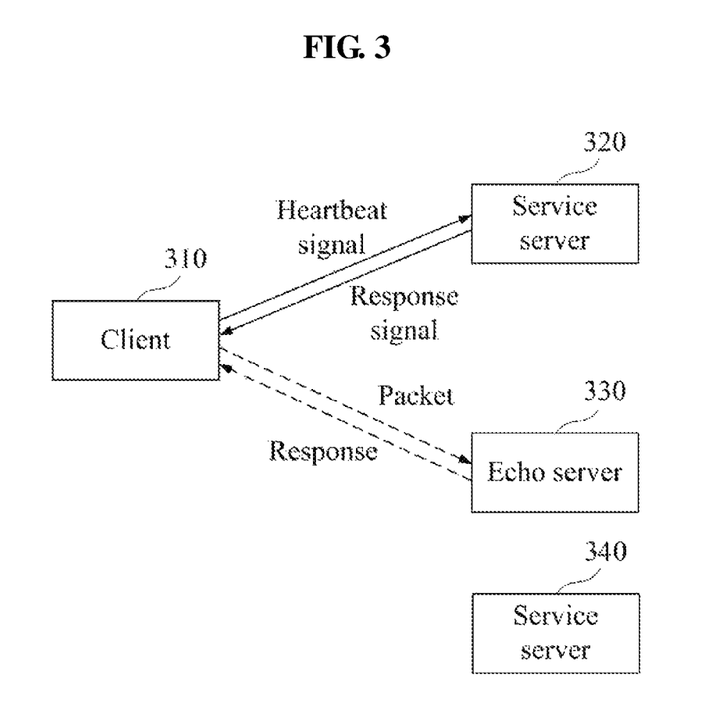
FIG. 3 illustrates an example of a service providing environment according to at least one example embodiment.

FIG. 3 illustrates an example of a service providing environment according to at least one example embodiment. FIG. 3 illustrates a client 310, a service server 320, an echo server 330, and a service server 340. Although FIG. 3 depicts a single client, two service servers and a single echo server, some example embodiments may include more or fewer service servers and/or more clients and/or echo servers.

The client 310 may be a computer program installed on a computer apparatus such as the electronic device 110 (e.g., the client 310 may be stored in the memory 211 and executed by the at least one processor 212 to perform operations described herein as being performed by the client 310) and may control the electronic device 110 so that the electronic device 110 may connect to the service server 320 and/or the service server 340 over the network 170 and may use a service provided from the service server 320 and/or the service server 340. According to some example embodiments, the service server 320 and the service server 340 may each be similar to or the same as the server 150. Operations described herein as being performed by the service server 320 and/or the service server 340 may be performed by the at least one processor (e.g., the processor 222) executing program code that includes instructions corresponding to the operations. The instructions may be stored in a memory (e.g., the memory 221) of the service server 320. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and/or a field programmable gate array (FPGA).

The service server 320 and/or the service server 340 may each be at least one computer apparatus (e.g., the server 150) that provides a service to the client 310 over the network 170. The echo server 330 may be a computer apparatus configured to receive a packet transmitted from the electronic device 110 and to immediately, or promptly, transmit a response to the received packet to the electronic device 110 under control of the client 310. According to some example embodiments, the echo server 330 may be similar to or the same as the server 160. Operations described herein as being performed by the echo server 330 may be performed by at least one processor executing program code that includes instructions corresponding to the operations. The instructions may be stored in a memory of the echo server 330.

The client 310 may transmit a heartbeat signal to the service server 320. The heartbeat signal refers to a specific signal transmitted to inspect a state of a server based on a set time interval. The client 310 may transmit (e.g., send) a heartbeat signal to the service server 320 at set intervals (e.g., a heartbeat signal transmission interval). In this case, the service server 320 may transmit a response signal to the received heartbeat signal to the client 310 and the client 310 may inspect a state of the service server 320 based on the received response signal.

Although the service server 320 normally provides a service, the client 310 may not receive the response signal to the heartbeat signal from the service server 320 based on a state of the network 170, for example, a state in which a mobile terminal connects to an access network in a mobile environment (e.g., a network fault caused by signal interference, etc.). As described above, in the related art, a conventional client may erroneously determine such a network fault as a fault of a server providing a service (e.g., the service server 320) or may erroneously determine that a continuous service is impossible. Here, the network fault may refer to, for example, a state in which the conventional client is located in a shadowing area and thus, unconnectable to the access network or the access network is incapable of processing the client access due to a poor state of the access network in the mobile environment.

The client 310 according to some example embodiments may identify the service server 320 and the echo server 330 and may transmit (e.g., send) a packet to the echo server 330 when no response signal is received from the service server 320. In response to receiving the packet, the echo server 330 may transmit a response to the packet to the client 310. When the response is received from the echo server 330, the client 310 may verify (e.g., determine) that a network fault is absent and an issue (e.g., fault) is present in the service server 320. When no response is received from the echo server 330, the client 310 may verify that a fault is absent in the service server 320 and present in the network 170. In so doing, the client 310 improves over the related art by correctly diagnosing a lack of responsiveness from the service server 320 as a server or network fault, thereby improving the continuity of service by avoiding unnecessary server disconnections. In FIG. 3, arrow indicators indicated with dotted lines may indicate that the packet and the response to the packet are transmitted and received between the client 310 (e.g., the electronic device 110) and the echo server 330 when no response signal to the heartbeat signal is received.

To further improve diagnosis accuracy, the client 310 may selectively diagnose a fault of the service server 320 and a fault of the network 170 by exchanging the heartbeat signal and the response signal, and the packet and the response to the packet, several times instead of exchanging only once. For example, when the client 310 does not receive a response signal to a heartbeat signal from the service server 320, in spite of transmitting the heartbeat signal to the service server 320 at set intervals, the client 310 may transmit a packet to the echo server 330. Here, when a response to the packet is received from the echo server 330, the client 310 may increase a 'NoResponseCount' (e.g., a counter maintained by the client 310 initialized to 0) by 1 and may wait for a response signal of the service server 320 to a heartbeat signal of a subsequent period. When the response signal to the heartbeat signal of the subsequent period is not received from the service server 320, the client 310 may transmit again the packet to the echo server 330. When the response to the packet is received again from the echo server 330, the client 310 may increase the 'NoResponseCount' by 1. As described, a situation in which the response signal to the heartbeat signal is not received from the service server 320, and the response to the packet is received from the echo server 330, may be consecutively repeated. Accordingly, if the 'NoResponseCount' exceeds a set 'MaxWaitResponseCount' (e.g., a set threshold value), the client 310 may determine that a fault has occurred in the service server 320. If the response signal to the heartbeat signal is received before the 'NoResponseCount' exceeds the 'MaxWaitResponseCount', or if the response to the packet is not received from the echo server 330, the client 310 may determine that a temporary network fault has occurred and may initialize again the 'NoResponseCount' to zero.

That is, when the situation in which the response signal to the heartbeat signal is not received from the service server 320, and the response to the packet is received from the echo server 330, occurs a set number of times or more, the client 310 may diagnose a fault of the service server 320. Here, diagnosing the fault of the service server 320 may indicate that the client 310 determines a current situation (e.g., the non-reception of the response signal to the heartbeat signal and reception of the response to the packet) as occurrence of the fault in the service server 320. In response to such a diagnosis, the client 310 may process a corresponding follow-up operation, for example, the client 310 may attempt connection to the service through another service server (e.g., the service server 340).

Also, when a situation in which the response signal to the heartbeat signal is not received from the service server 320, and the response to the packet is not received from the echo server 330, occurs a set number of times or more, the client 310 may diagnose a fault of the network 170. Here, diagnosing the fault of the network 170 may indicate that the client 310 determines the current situation (e.g., e.g., the non-reception of the response signal to the heartbeat signal and non-reception of the response to the packet) as occurrence of the fault in the network 170. In response to such a diagnosis, the client 310 may process a corresponding follow-up operation, for example, the client 310 may wait for connection to the service server 320 or attempt to connect to another access network since a continuous service of the service server 320 is possible.

As described above, the client 310 may identify the echo server 330, which is a server separate from the service server 320 providing a service, and may use the identified echo server 330 for service continuity management.

Also, the client 310 may manage the service continuity by applying the echo server 330 to search for a pinhole time.

Figure 4:
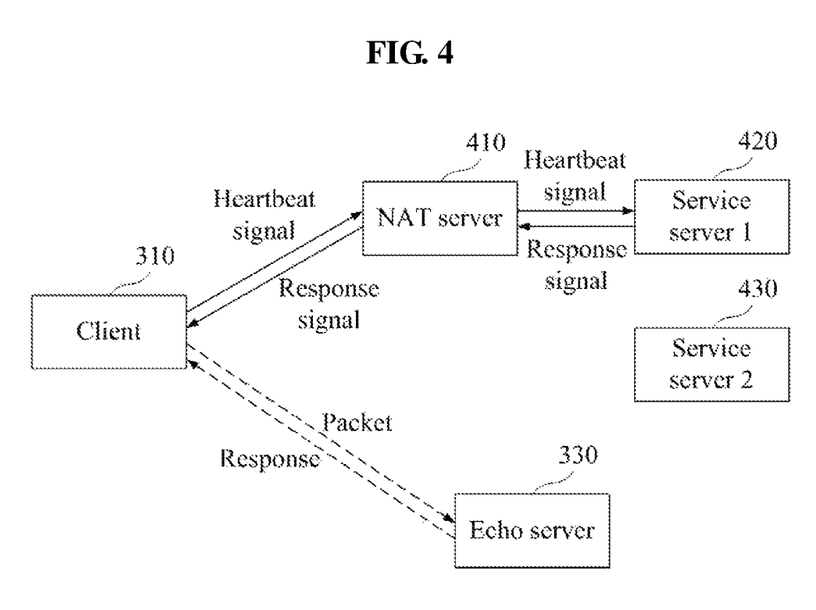
FIG. 4 illustrates another example of a service providing environment according to at least one example embodiment.

FIG. 4 illustrates another example of a service providing environment according to at least one example embodiment. FIG. 4 illustrates a client 310, a network address translation (NAT) server 410 and a plurality of service servers, for example, a service server 1 420 and a service server 2 430. According to some example embodiments, the client 310, the service server 1 420 and the service server 2 430 may be similar to or the same as the client 310, the service server 320 and the service server 340, respectively. Here, it is assumed that the client 310, installed on a computer apparatus such as the electronic device 110, is connected to the service server 1 420 through the NAT server 410. According to some example embodiments, operations described herein as being performed by any or all of NAT server 410, the service server 1 420, and the service server 2 430 may be performed by at least one processor executing program code that includes instructions corresponding to the operations. The instructions may be stored in a memory. Although FIG. 3 depicts two service servers, a single echo server, and a single NAT server, some example embodiments may include more or fewer service servers and/or more clients, echo servers and/or NAT servers.

The NAT server 410 may serve as an address converter of a communication network used to convert a private IP address to a public IP address, and may open a pinhole (e.g., a communication link) with a target service server, for example, the service server 1 420 herein, in response to a request from the client 310. Here, a pinhole time (also referred to herein as a duration of the pinhole) may indicate an amount of time during which the pinhole is open. The service server 1 420 may transfer a signal to the client 310 only during a period of time during which the pinhole is open. That is, the service server 1 420 may not autonomously open the pinhole without receiving the request from the client 310. Once the pinhole is closed, the service server 1 420 may not transmit a signal to the client 310 until a new pinhole is opened in response to the request from the client 310. Here, a different pinhole time may be set for each service and the client 310 measures (e.g., determines) the pinhole time in order to transmit the heartbeat signal and/or receive the corresponding response within the pinhole time.

For example, it is assumed that a pinhole time set between the NAT server 410 and the service server 1 420 is 3 seconds, and that the client 310 transmits a heartbeat signal to the service server 1 420 based on a time interval (e.g., the heartbeat signal transmission interval) of 5 seconds. In this case, a situation in which the pinhole between the NAT server 410 and the service server 1 420 is set, that is, open for 3 seconds and closed for 2 seconds and then set for 3 seconds and closed for 2 seconds may be repeated. During 2 seconds in which the pinhole is closed, the service server 1 420 may not transmit a signal to the client 310. When a time interval for transmitting the heartbeat signal, and receiving the corresponding response, is within 3 seconds, the pinhole between the NAT server 410 and the service server 1 420 may be continuously maintained. That is, to maintain the pinhole between the NAT server 410 and the service server 1 420, a time interval for transmitting the heartbeat signal and receiving the corresponding response may be maintained within the pinhole time. Accordingly, the client 310 verifies an appropriate pinhole time. For example, the client 310 verifies an amount of time that is to be set for the time interval for transmitting the heartbeat signal and receiving the corresponding response.

To verify the pinhole time, the client 310 may transmit, to the service server 1 420, a heartbeat signal including a set response delay time D. In response to receiving the heartbeat signal, the service server 1 420 may transmit a response signal to the received heartbeat signal to the client 310 after the set response delay time D is elapsed. When the response signal is not received from the service server 1 420 even after a time of D+a is elapsed, the client 310 may transmit a packet to the echo server 330. Here, 'a' denotes a set time. When a response to the packet is received from the echo server 330, the client 310 may determine that a fault is absent in the network 170, and may recognize a possibility that the response signal has not been transmitted from the service server 1 420 as a result of the delay time D (e.g., the response signal was sent after the pinhole closed), or a possibility that a fault has occurred in the service server 1 420. In this case, the client 310 may transmit, to the service server 1 420, a heartbeat signal including a set response delay time D' that is shorter than the response delay time D.

For example, it is assumed that the response delay time D is 5 seconds and the pinhole time is 3 seconds. When a heartbeat signal including the set response delay time D of 5 seconds is received by the NAT server 410, the NAT server 410 may set the pinhole and may transmit the heartbeat signal to the service server 1 420. The service server 1 420 may generate a response signal after 5 seconds and may attempt to transmit the response signal to the NAT server 410. Here, since the pinhole time is 3 seconds, the pinhole is closed and the attempt by the service server 1 420 to transmit the response signal may fail. Since the response signal is not received, the client 310 may transmit a packet to the echo server 330 and may receive a response to the packet from the echo server 330. In this case, the client 310 may verify a possibility that a fault is absent in the access network and no response signal is received from the service server 1 420 since the response delay time D of 5 seconds is set to be greater than the initially set pinhole time. Accordingly, the client 310 may reduce the response delay time D from 5 seconds to 2.5 seconds, and may transmit again the heartbeat signal. According to some example embodiments, a decrease amount of the response delay time D may vary. In this case, the service server 1 420 may transmit the response signal after 2.5 seconds. Since the pinhole with the pinhole time of 3 seconds is still open, the response signal may be transferred to the client 310 through the NAT server 410. In this case, the client 310 may be aware, or may determine, that 2.5 seconds is at least within the pinhole time.

The client 310 may measure the pinhole time with greater accuracy by transmitting the heartbeat signal while continuously adjusting the response delay time D. For example, when it is assumed that a response to a packet is continuously received from the echo server 330, the client 310 that receives the response signal from the service server 1 420 may set, as the response delay time D, 3.75 seconds (e.g., a time that is a halfway between 5 seconds, of the initially set response delay time D, and 2.5 seconds, of the subsequently set response delay time D) and may transmit the heartbeat signal. In this case, considering that the pinhole time is 3 seconds, the client 310 may not receive a response signal to the heartbeat signal. The client 310 may then transmit again, to the service server 1 420, a heartbeat signal in which 3.125 seconds (e.g., a time that is a halfway between 2.5 seconds and 3.75) is set as the response delay time D. Even in this case, considering that the pinhole time is 3 seconds, the client 310 may not receive a response signal to the heartbeat signal. The client 310 may then transmit again, to the service server 1 420, a heartbeat signal in which 2.8125 seconds (e.g., a time that is halfway between 2.5 seconds and 3.125 seconds) is set as the response delay time D. In this case, considering that the pinhole time is 3 seconds, the client 310 may receive a response signal to the heartbeat signal and may verify that 2.8125 seconds is within the pinhole time.

Once the appropriate pinhole time (2.8125 seconds in the above example) is found, the client 310 may transmit a heartbeat signal based on the found (e.g., measured and/or determined) pinhole time. According to some example embodiments, after the appropriate pinhole time is found, the client 310 may transmit a series of heartbeat signals, without including the response delay time with the heartbeat signals, based on the appropriate pinhole time. According to some example embodiments, the response delay time D may be set to zero seconds. Since 2.8125 seconds is greater than 2.5 seconds, the client 310 may maintain the pinhole while reducing a number of times the heartbeat signal is transmitted by changing the response delay time D from 2.5 seconds to 2.8125 seconds.

When the response to the packet is continuously received from the echo server 330 and no response signal is received from service server 1 420 even after the response delay time D is reduced to, for example, zero seconds, the client 310 may diagnose a fault of the service server 1 420.

When no response to the packet is received from the echo server 330, the client 310 may determine that the response signal is not received from the service server 1 420 due to a fault of the access network, not due to the pinhole time (e.g., a response delay time D of excessive length) or a fault of the service server 1 420. Accordingly, the client 310 may transmit the heartbeat signal to the service server 1 420 while maintaining the initial response delay time D of, for example, 5 seconds. When no response is received from the service server 1 420 or the echo server 330 at least a set number of times, the client 310 may diagnose a fault of the network 170.

By using the echo server 330 during a process of finding an appropriate transmission interval (or pinhole time) of the heartbeat signal to maintain the pinhole, erroneous fault diagnosis by the client 310 may be prevented or reduced.

Figure 5:
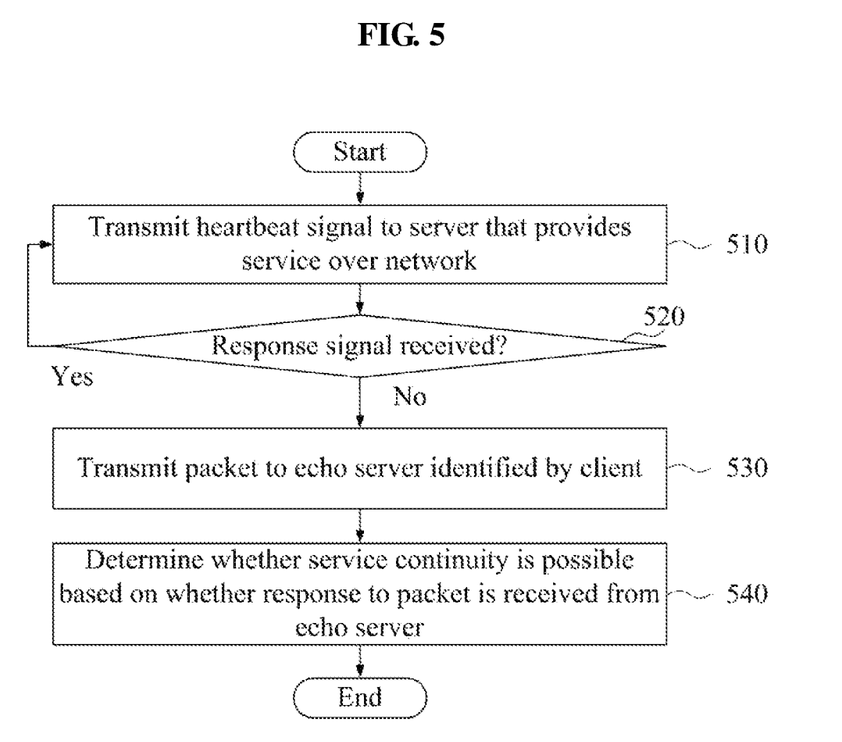
FIG. 5 is a flowchart illustrating an example of a continuity management method according to at least one example embodiment.

FIG. 5 is a flowchart illustrating an example of a continuity management method according to at least one example embodiment. The continuity management method of FIG. 5 may be performed by a computer apparatus similar to or the same as the electronic device 110 on which the client 310 is installed and executed. Here, the processor 212 of the electronic device 110 may be configured to execute an instruction according to a code of the client 310 and/or a code of the OS included in the memory 210. Here, the processor 212 may control the electronic device 110 to perform operations 510 through 540 included in the continuity management method of FIG. 5 in response to a control instruction provided from the code of the electronic device 110.

Referring to FIG. 5, in operation 510, the electronic device 110 may transmit a heartbeat signal to a server that provides a service over a network (e.g., network 170). Here, the server may correspond to the service server 320 or the service server 1 420, and may be identified on the electronic device 110 by the client 310.

In operation 520, the electronic device 110 may verify whether a response signal to the heartbeat signal is received. Here, when the response signal to the heartbeat signal is received from the server providing the service, the electronic device 110 may periodically retransmit the heartbeat signal by performing operation 510 again. On the contrary, when the response signal is not received from the server providing the service, operation 530 may be performed.

In operation 530, the electronic device 110 may transmit a packet to an echo server identified by the client. The client may correspond to the client 310 of FIG. 3 and the echo server may correspond to the echo server 330. As described above, the echo server is configured to immediately, or promptly, transmit a response to the received packet (assuming that a fault in the network does not occur).

In operation 540, the electronic device 110 may determine whether service continuity is possible based on whether the response to the packet is received from the echo server (e.g., whether the electronic device 110 is connected to the network). The service continuity determination may be used during a process of selectively diagnosing a network fault or a server fault, or determining a transmission interval, or a pinhole time, of the heartbeat signal to maintain a pinhole.

Figure 6:
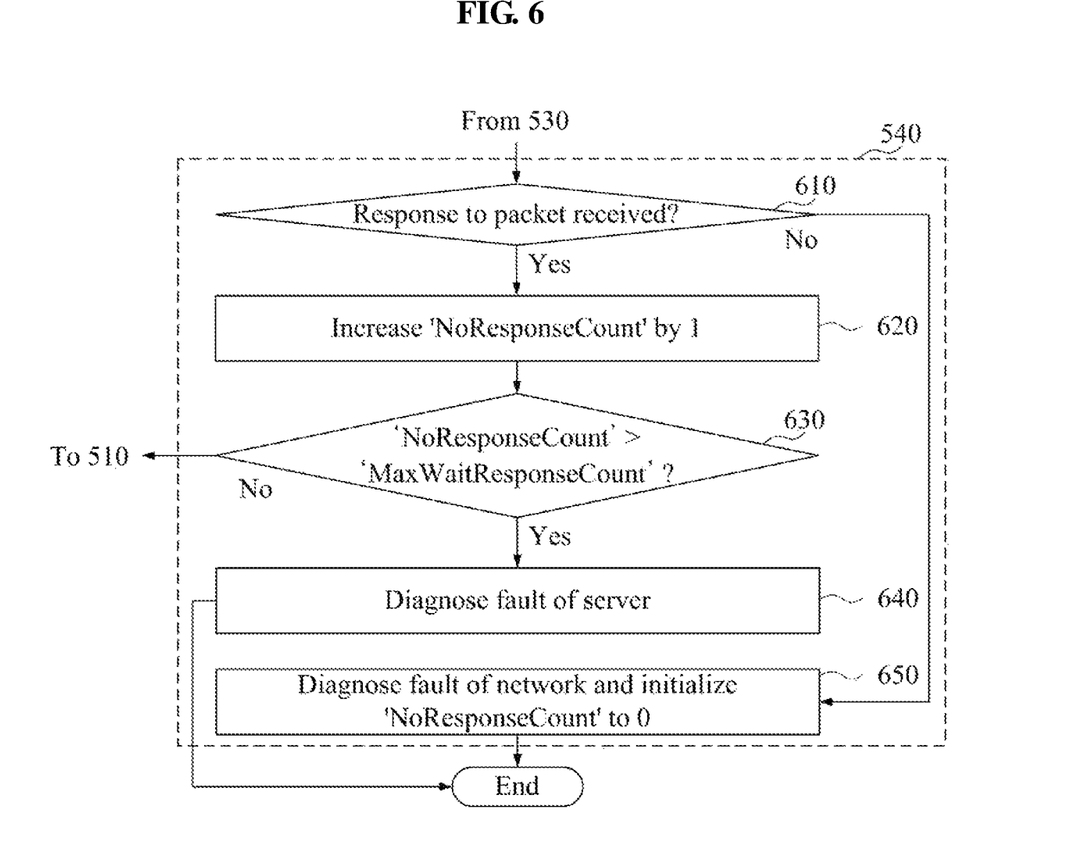
FIG. 6 is a flowchart illustrating an example of a process of selectively diagnosing a fault of a network and a fault of a server according to at least one example embodiment.

FIG. 6 illustrates an example of a process of selectively diagnosing a network fault or a server fault according to at least one example embodiment. Operations 610 through 650 of FIG. 6 may be included in operation 540 of FIG. 5 and thereby performed.

Referring to FIG. 6, in operation 610, the electronic device 110 may verify whether the response to the packet is received. When the response to the packet is received from the echo server, the electronic device 110 may perform operation 620 and, otherwise, may perform operation 650.

In operation 620, the electronic device 110 may increase 'NoResponseCount' by 1. The reception of the response to the packet from the echo server may indicate that a fault is absent in an access network and thus, may imply a fault of a server (e.g., the service server 320 or the service server 1 420). According to some example embodiments, the electronic device 110 determines a fault in the server based on receiving the response to the packet from the echo server. According to some example embodiments, variables, for example, 'NoResponseCount' and 'MaxWaitResponseCount', may be used for a more accurate diagnosis of a network fault or a server fault.

In operation 630, the electronic device 110 may verify whether 'NoResponseCount' exceeds 'MaxWaitResponseCount'. Here, when 'NoResponseCount' exceeds 'MaxWaitResponseCount', the electronic device 110 may perform operation 640. Otherwise, that is, when 'NoResponseCount' is less than or equal to 'MaxWaitResponseCount', process returns to operation 510 so that the heartbeat signal may be periodically transmitted to the server providing the service. Here, when the response signal to the heartbeat signal is not received from the server in operation 520, the packet may be transmitted again to the echo server in operation 530 and operation 540 may be performed again.

According to some example embodiments, if 'MaxWaitResponseCount'='0', operation 630 may be performed a single time after which the process advances to operation 640 without returning to operation 510.

In operation 640, the electronic device 110 may diagnose a fault of the server. As described above, diagnosing the fault of the server include a determination by the client that the current situation (e.g., e.g., the non-reception of the response signal to the heartbeat signal and reception of the response to the packet) as occurrence of the fault in the server. In response to such a diagnosis, the client may process a corresponding follow-up process, for example, the client may attempt to connect to the service through another server.

In operation 650, the electronic device 110 may diagnose a fault of the network and may initialize 'NoResponseCount' to 0. That is, the electronic device 110 may determine that the response signal to the heartbeat signal is not received from the server due to the fault of the network and the server maintains the service continuity. To this end, the electronic device 110 may initialize (e.g., reinitialize) 'NoResponseCount' to zero and wait for the response signal from the server. Depending on example embodiments, the electronic device 110 may count a number of times that the response to the packet is not received from the echo server and may determine the fault of the network if the counted number of times exceeds a set number of times. In this case, the set number of times may be less than 'MaxWaitResponseCount'.

Figure 7:
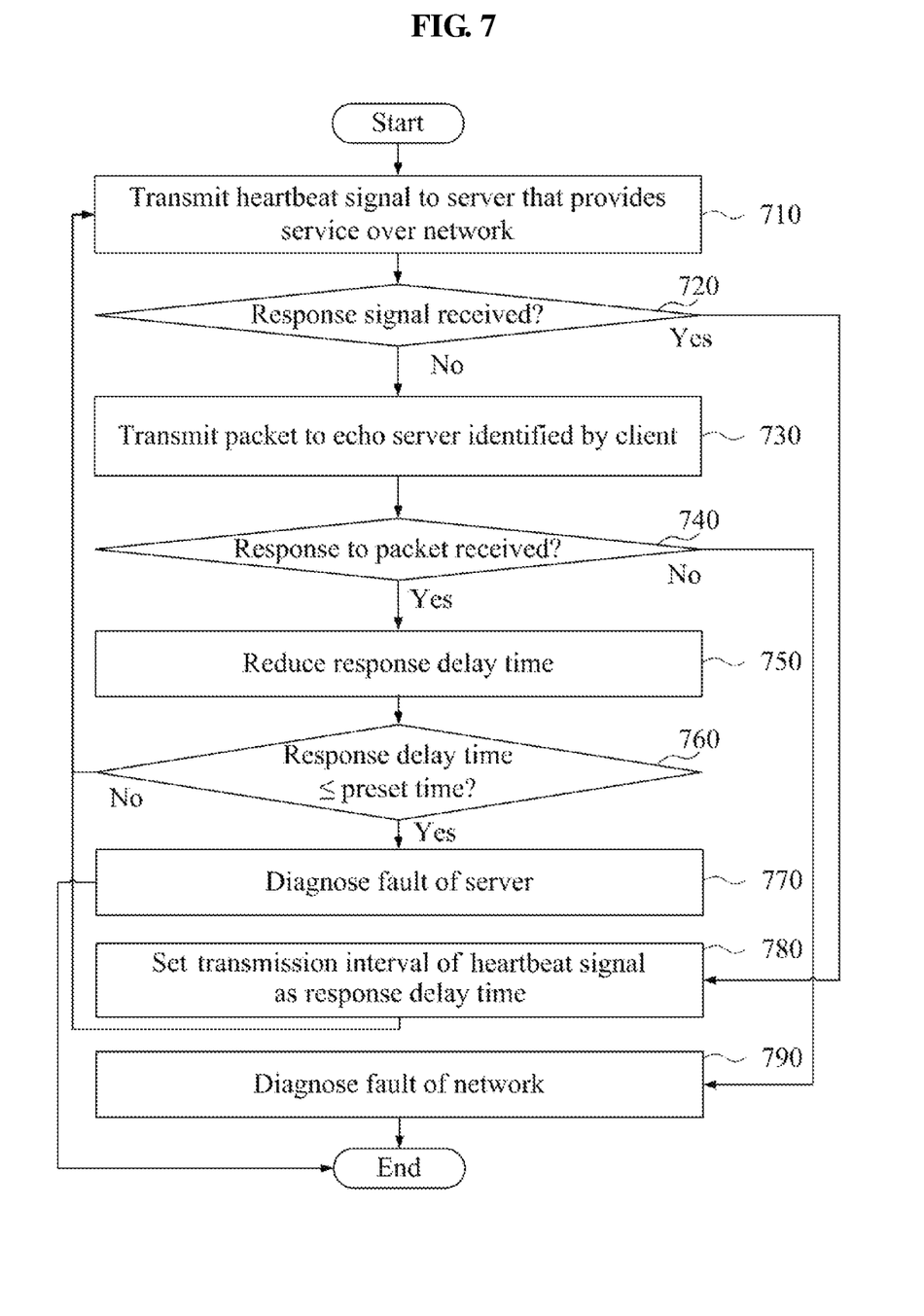
FIG. 7 is a flowchart illustrating an example of a process of searching for an appropriate pinhole time according to at least one example embodiment.

FIG. 7 is a flowchart illustrating an example of a process of searching for an appropriate pinhole time according to at least one example embodiment. Operations 710 through 730 of FIG. 7 may correspond to operations 510 through 530 of FIG. 3.

Referring to FIG. 7, in operation 710, the electronic device 110 may transmit a heartbeat signal to a server that provides a service over a network. Here, the server may correspond to the service server 320 or the service server 1 420 and may be identified on the electronic device 110 through the client 310. Also, a set response delay time for the server may be included in the heartbeat signal.

In operation 720, the electronic device 110 may verify whether a response signal to the heartbeat signal is received. Here, when the response signal to the heartbeat signal is received from the server providing the service, the electronic device 110 may perform operation 780. Otherwise, the electronic device 110 may perform operation 730.

In operation 730, the electronic device 110 may transmit a packet to an echo server identified by the client. The client may correspond to the client 310 of FIG. 3 and the echo server may correspond to the echo server 330. As described above, the echo server may be configured to immediately, or promptly, transmit a response to the received packet (assuming that a fault in the network does not occur).

In operation 740, the electronic device 110 may verify whether a response to the packet is received from the echo server. When the response to the packet is received from the echo server, the electronic device 110 may perform operation 750. Otherwise, the electronic device 110 may perform operation 790.

In operation 750, the electronic device 110 may reduce the response delay time. As described above, when the response signal is not received from the server providing the service and the response is received from the echo server, there may either be a fault of the server or the pinhole may be closed due to the response delay time being greater than the pinhole time. Here, the electronic device 110 may reduce the response delay time to determine whether the pinhole is closed.

In operation 760, the electronic device 110 may determine whether the response delay time is less than or equal to a set time. For example, if the set time is '0' and the reduced response delay time is '0', it may indicate that the response signal to the heartbeat signal is not received because of a fault present in the server and not because the pinhole is closed. If the response delay time is greater than the set time, operation 710 may be performed again. Here, the response delay time reduced in operation 750 may be set and included in the heartbeat signal transmitted in operation 710.

In operation 770, the electronic device 110 may diagnose a fault of the server. As described, if the response delay time is determined to be less than or equal to the set time in operation 760, the electronic device 110 may diagnose the fault of the server. As a result of operation 770, the pinhole time search process may be terminated.

In operation 780, the electronic device 110 may set a transmission interval of the heartbeat signal as the response delay time. The reception of the response signal to the heartbeat signal in operation 720 may indicate that the response delay time is at least within the pinhole time and may also indicate that the pinhole may be maintained if the heartbeat signal is transmitted every current response delay time. Accordingly, the electronic device 110 may maintain the pinhole by setting the transmission interval of the heartbeat signal as the current response delay time in operation 780. As described above, depending on example embodiments, it is possible to maintain the pinhole and also to increase the heartbeat signal transmission interval by measuring an accurate pinhole time.

In operation 790, the electronic device 110 may diagnose a fault of the network. When the response to the packet is not received from the echo server in operation 740, the electronic device 110 may diagnose the fault of the network such as a fault of an access network. As described above, the electronic device 110 may count a number of times that the response to the packet is not consecutively received from the echo server and may diagnose the fault of the network if the counted number of times exceeds a set number of times.

According to some example embodiments, a client may distinguishably diagnose an issue of a server providing a service and an issue of a network. Also, in response to receiving no response from the server providing the service, the client may transmit a packet to a separate echo server and may selectively diagnose a fault of the server and a fault of the network depending on whether a response to the packet is received from the echo server. Also, according to some example embodiments, an appropriate pinhole time may be discovered by applying the echo server to measure a pinhole time between the server providing the service and a NAT.

The systems and or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable recording medium storing instructions that, when executed by at least one processor, cause the at least one processor to perform a continuity management method comprising:
sending a heartbeat signal to a service server that provides a service over a network;
sending a packet to an echo server in response to failing to receive a response signal to the heartbeat signal from the service server;
continuing to attempt reception of the service provided by the service server over the network in response to failing to receive a response to the packet from the echo server;
diagnosing a fault of the service server in response to receiving the response to the packet from the echo server; and
diagnosing a fault of the network in response to failing to receive the response to the packet from the echo server.

2. The non-transitory computer-readable recording medium of claim 1, wherein
the continuing to attempt reception of the service continues to attempt reception of the service based on the diagnosing the fault of the network; or
the continuity management method further comprises
discontinuing attempted reception of the service provided by the service server over the network based on the diagnosing the fault of the service server.

3. The non-transitory computer-readable recording medium of claim 2, wherein the continuity management method further comprises:
repeating the sending the heartbeat signal, and the sending the packet, a set number of times
wherein the diagnosing the fault of the service server diagnoses the fault of the service server in response to
failing to receive the response signal to any of the heartbeat signals from the service server, and
receiving the response to each of the packets from the echo server.

4. The non-transitory computer-readable recording medium of claim 2, wherein the continuity management method further comprises:
repeating the sending the heartbeat signal and the sending the packet a set number of times,
wherein the diagnosing the fault of the network diagnoses the fault of the network in response to
failing to receive the response signal to any of the heartbeat signals from the service server, and
failing to receive the response to any of the packets from the echo server.

5. The non-transitory computer-readable recording medium of claim 1, wherein the continuity management method further comprises:
adjusting a response delay time of the service server for a next heartbeat signal to be sent to the service server in response to
receiving the response to the packet from the echo server, and
measuring a pinhole time between the service server and a network address translation (NAT) server associated with the service server.

6. The non-transitory computer-readable recording medium of claim 5, wherein the adjusting the response delay time comprises reducing the response delay time.

7. The non-transitory computer-readable recording medium of claim 5, wherein the continuity management method further comprises:
transmitting the next heartbeat signal without the response delay time to the service server according to the pinhole time.

8. The non-transitory computer-readable recording medium of claim 1, wherein the echo server is configured to transmit the response to the packet upon receiving the packet.

9. A continuity management method performed by a client driven by a computer apparatus, the method comprising:
sending a heartbeat signal to a service server that provides a service over a network;
sending a packet to an echo server in response to failing to receive a response signal to the heartbeat signal from the service server;
continuing to attempt reception of the service provided by the service server over the network in response to failing to receive a response to the packet from the echo server;
diagnosing a fault of the service server in response to receiving the response to the packet from the echo server; and
diagnosing a fault of the network in response to failing to receive the response to the packet from the echo server.

10. The method of claim 9, wherein
the continuing to attempt reception of the service continues to attempt reception of the service based on the diagnosing the fault of the network; or
the continuity management method further comprises
discontinuing attempted reception of the service provided by the service server over the network based on the diagnosing the fault of the service server.

11. The method of claim 10, wherein the method further comprises:
repeating the sending the heartbeat signal, and the sending the packet, a set number of times, wherein
the diagnosing the fault of the service server diagnoses the fault of the service server in response to
failing to receive the response signal to any of the heartbeat signals from the service server, and
receiving the response to each of the packets from the echo server; and
the diagnosing the fault of the network diagnoses the fault of the network in response to
failing to receive the response signal to any of the heartbeat signals from the service server, and
failing to receive the response to any of the packets from the echo server.

12. The method of claim 9, wherein the method further comprises:
adjusting a response delay time of the service server for a next heartbeat signal to be sent to the service server in response to
receiving the response to the packet from the echo server, and
measuring a pinhole time between the service server and a network address translation (NAT) server associated with the service server.

13. The method of claim 12, wherein the adjusting the response delay time comprises reducing the response delay time.

14. A non-transitory computer-readable recording medium storing instructions that, when executed by at least one processor, cause the at least one processor to perform the method of claim 9.

15. A computer apparatus configured to drive a client, comprising:
   at least one processor configured to execute non-transitory computer-readable instructions to
      send a heartbeat signal to a service server that provides a service over a network,
      send a packet to an echo server in response to failing to receive a response signal to the heartbeat signal from the service server,
      continue to attempt reception of the service provided by the service server over the network in response to failing to receive a response to the packet from the echo server,
      diagnose a fault of the service server in response to receiving the response to the packet from the echo server; and
      diagnosing a fault of the network in response to failing to receive the response to the packet from the echo server.

16. The computer apparatus of claim 15, wherein the at least one processor is configured to execute non-transitory computer-readable instructions to adjust a response delay time of the service server for a next heartbeat signal to be sent to the service server in response to
   receiving the response to the packet from the echo server, and
   measuring a pinhole time between the service server and a network address translation (NAT) server associated with the service server.

* * * * *